Dec. 14, 1937.  C. H. GIBERSON  2,101,938
LUBRICATED SWIVEL PIPE JOINT
Filed Sept. 1, 1937

INVENTOR
CHIPMAN H. GIBERSON
Thomas R. Harney
ATTORNEY

Patented Dec. 14, 1937

2,101,938

UNITED STATES PATENT OFFICE 2,101,938

LUBRICATED SWIVEL PIPE JOINT

Chipman H. Giberson, Elyria, Ohio

Application September 1, 1937, Serial No. 162,019

2 Claims. (Cl. 285—9)

The present invention relates to an improved lubricated swivel pipe-joint or swing joint between two angularly disposed pipes, or between a stationary part of the joint that is fixed or supported on a fitting that may be mounted on a tank furnishing a source of supply for motive fluid. The joint is also adapted for use in pipe-lines conveying steam, air under presure, water, grease and similar fluids, and when so used the pipe-joint provides a convenient connection between movable parts of the pipe line, and in which the movable parts are permanently lubricated and also permanently sealed against leakage of the motive fluid being conveyed through the joint.

In carrying out my invention I provide the swivel or movable part of the joint with a ground seat on the stationary part of the joint, and this metal to metal arrangement insures a durable joint that is automatically adjusted to take up wear, or to compensate for wear at the bearing of the joint, thus preventing leaks from the joint. A suitable lubricant, as grease or oil, is contained in the joint-device, and escape or waste of the lubricant is prevented by the novel arrangement of the several parts of the joint.

The invention consists in certain novel combinations and arrangements of parts as will hereinafter be more fully set forth and claimed. In the accompanying drawing I have illustrated one complete example of the physical embodiment of my invention wherein the parts are combined and arranged according to one mode I have devised for the practical application of the principles of my invention. It will be understood that changes and alterations may be made in the exemplifying structures within the scope of my claims, without departing from the principles of my invention.

Figure 1:
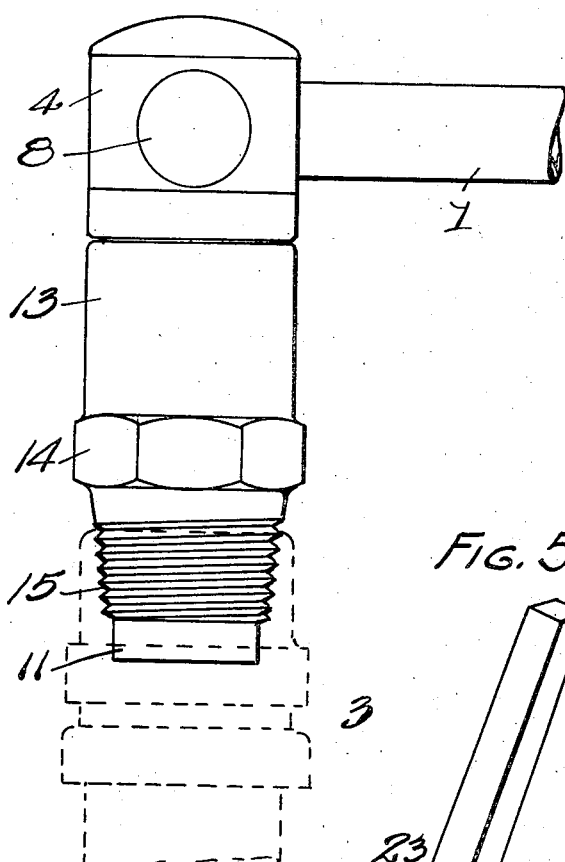
Figure 1 is a view in elevation of the swivel pipe joint of my invention, mounted on a fitting shown in dotted lines, and illustrating an outlet pipe from the joint.
Figure 4:
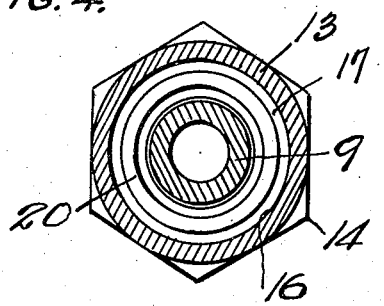
Figure 4 is a transverse sectional view at line 4—4 of Figure 3.
Figure 5:
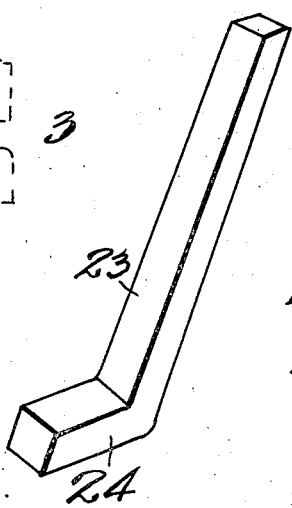
Figure 5 is a perspective view showing an auxiliary tool that may be employed in assembling the parts of the joint.

In Figure 1 I have shown an outlet pipe 1 connected to the joint, and the source of supply for the motive fluid may be an inlet pipe 2 that is connected with the joint through a suitable fitting 3. The parts 2 and 3 do not form elements in my invention, and therefore these parts are indicated by dotted lines, and it will be understood that the joint may be mounted for use in other fittings or supports through which the supply of motive fluid passes to the joint, and thence out through the outlet pipe 1.

In the construction of the joint I utilize only metal parts, that are freely lubricated, to insure smooth operation of the joint, and to reduce wear, and these parts are made up of appropriate material.

Figure 3:
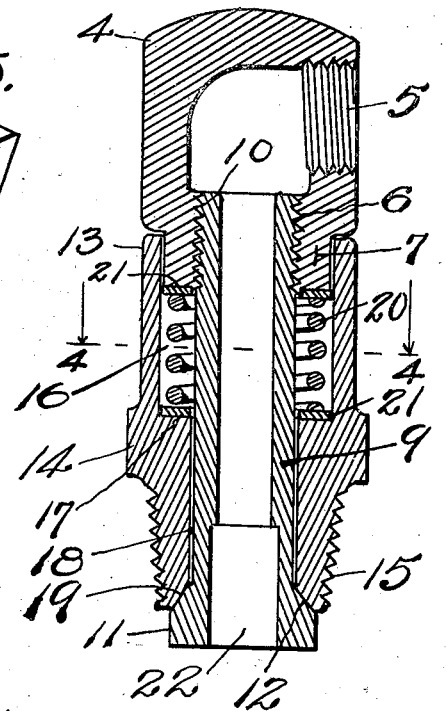
Figure 3 is a vertical sectional view of the joint.

As best seen in Figure 3 I employ a hollow coupling head 4 that is threaded at 5 for the outlet pipe 1, and this head also has a lower threaded aperture 6 that extends through a cylindrical collar 7. The head, of course, may be of any suitable shape, to provide the threaded holes 5 and 6, and the exterior of the head, which is generally cylindrical in shape is shown with flat faces as 8 so that the head may be grasped by a tool, or clasped in a vise, while the parts are being assembled.

The coupling head forms a rotary part of the joint, or a swiveled part, that may oscillate in the stationary part of the joint, and of course the head may turn on a vertical axis as indicated in Figures 1 and 3, or the joint may be used in various other positions, depending on the installation of the joint.

The head is rigidly mounted on the upper end of a cylindrical nipple 9, which as shown, is fixed to the head by threads 10 screwed into the collar 7 of the head, and it will be understood that these rigidly joined parts 4 and 9 provide the swivel feature of the joint. At its lower end the nipple 9 is fashioned with an enlarged circular head 11, and this head merges with the exterior cylindrical face of the nipple through an annular tapered or beveled face or ring 12.

The nipple is enclosed within, and supported to turn or swivel within a stationary sleeve 13, that is fashioned with an exterior nut portion 14, and provided at its lower end with an externally threaded portion 15 by means of which the sleeve is screwed into the fitting 3, or other suitable connection, that is held stationary and which forms the support for the swivel joint.

The upper end of the sleeve is formed with a large bore 16 that provides a chamber for the lubricant that is sealed in the joint to lubricate the nipple and head, and the upper end of the sleeve surrounds the collar 7 of the head 4 to provide a journal bearing for the head. An interior, annular shoulder 17 forms the bottom wall of the larger bore or lubricant chamber, and below this shoulder the enclosing sleeve is fashioned with a smaller interior bore 18 that forms a bearing for the nipple 9 to turn in.

Between the collar 7 and the shoulder 17 a tension spring 20 is coiled about the nipple, and ring-washers 21, 21 are located at the ends of the spring for frictional contact with the annular face of the collar and the face of the shoulder 17.

Figure 2:
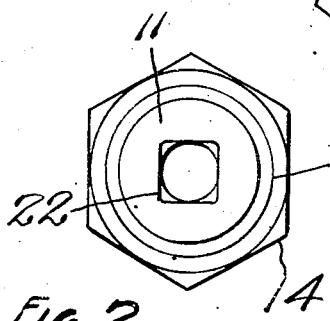
Figure 2 is a bottom view of the joint as seen in Figure 1 showing the bottom inlet port to the fitting.

As indicated in Figures 2 and 3, the circular bore of the nipple, at its lower end, is slightly enlarged and fashioned as a rectangular socket 22, and this socket is adapted to receive the complementary head 24 of a hand tool 23 that is employed in assembling the parts.

In assembling the parts of the joint, the spring and its two washers are first located within the sleeve 13, and then the nipple is slipped up through the smaller bore 18 of the sleeve to bring the tapered face 12 of the nipple against a complementary tapered seat 19 that is ground out of the lower end of the bushing or threaded end 15 of the sleeve. Thus the tapered face and the tapered seat form a ground bearing between the swiveled or movable nipple and the lower end of the stationary sleeve, and this closely fitting bearing effectually closes the joint against leakage of grease or other lubricant contained within the sleeve.

After the nipple is inserted upwardly through the small bore of the sleeve and through the spring and washers, the head 4 is threaded on the upper threaded end of the nipple, at which time the head 24 of the tool is inserted in its socket 22, and the tool is thus used to resist the nut 4 as it is screwed down on the threaded nipple. By screwing down the head 4, the spring is compressed between the face of the collar 7 and the shoulder 17, and the spring is thus employed to exert its tension to hold the tapered seat 19 and the tapered face 12, forming the ground joint, in close frictional contact.

After the head 4 is threaded on the nipple, the joint-device may be threaded in the fitting 3, and then the pipe 1 may be threaded to the head as indicated. Other modes, of course, may be employed for assembling the parts if desired or more convenient, than that just explained, and any suitable lubricant may be introduced into the chamber or bore 16 of the sleeve.

The journal bearing for the head comprising the upper end of the sleeve and the collar on the head, and the journal bearing for the nipple within the smaller bore of the sleeve, are both lubricated to facilitate the swivel movement of the head and nipple, and these two spaced bearings provide two supporting points that prevent wobbling of the swiveled part in the stationary part of the joint.

Any wear on the ground joint 12—19 is compensated for by expansion of the spring 20, which is under tension, and the spring at all times holds these tapered members of the joint in frictional contact to prevent waste or leakage of the lubricant.

The motive fluid, under pressure, as steam, air, water or grease, of course passes upwardly from the fitting 3 or other source of supply, through the socket 22 of the interior bore of the nipple, thence through the nipple and the head, and out through the pipe 1, or other member that is coupled to the head, thus avoiding the lubricant which is contained in the sleeve exterior of the nipple.

Having thus fully described my invention, what I claim as new and desire to secure by Letters Patent is:—

1. The combination in a lubricated swivel pipe-joint with a sleeve having a conical seat at one end and an enlarged bore at its other end forming a lubricant chamber, of a nipple swiveled in the sleeve and a conical shoulder on the nipple forming a ground-joint with the seat, a hollow head having a cylindrical collar fixed on the nipple, said collar forming a journal-bearing in the enlarged bore and closing the lubricant chamber, a spring in said chamber coiled about the nipple and interposed between said collar and a portion of the sleeve, and anti-friction washers located in the chamber at the ends of said spring.

2. The combination in a swivel pipe-joint with a sleeve having a conical seat, of a nipple swiveled in the sleeve and an exterior conical shoulder on one end of the nipple fitted in said seat, a hollow head rigid with the other end of said nipple, a journal bearing rigid with the head and located in said sleeve, and a compressed spring coiled about the nipple and interposed between said journal bearing and a portion of the sleeve.

CHIPMAN H. GIBERSON.